April 11, 1944.  H. A. STARRET  2,346,196
BOMBPROOF SHELTER
Filed Aug. 2, 1941  6 Sheets-Sheet 1

Inventor
Howard A. Starret
By
Attorney

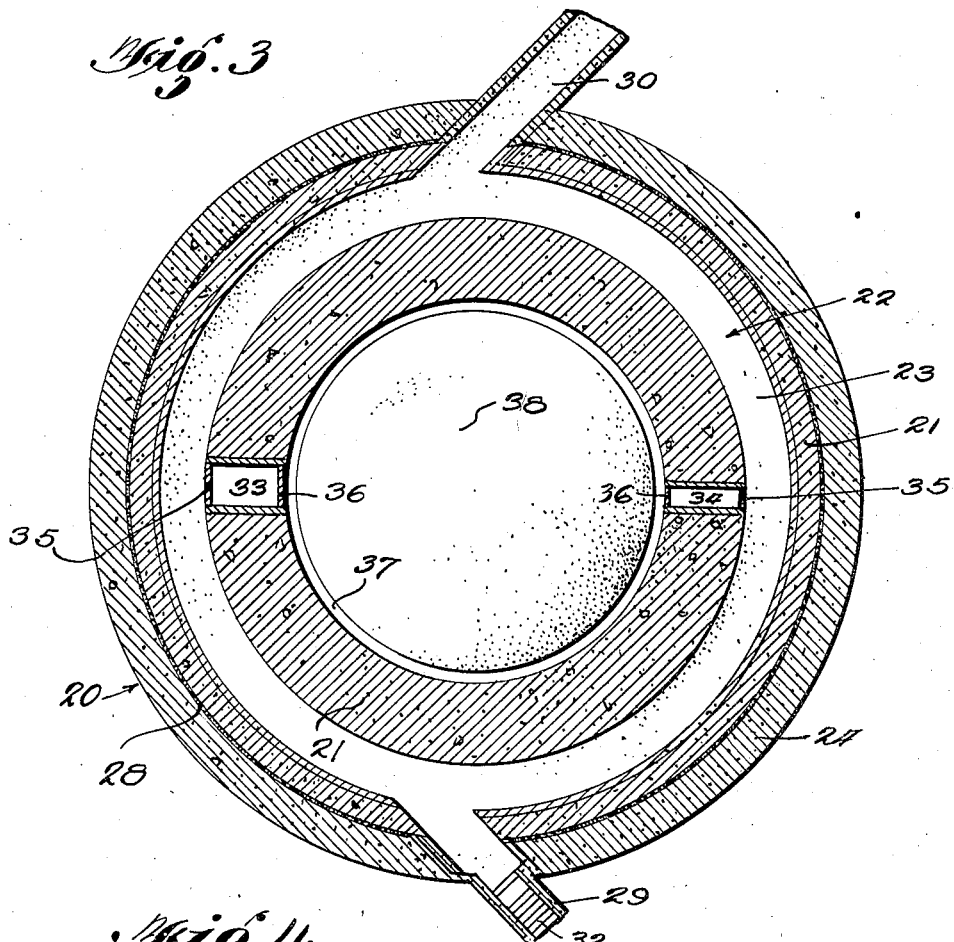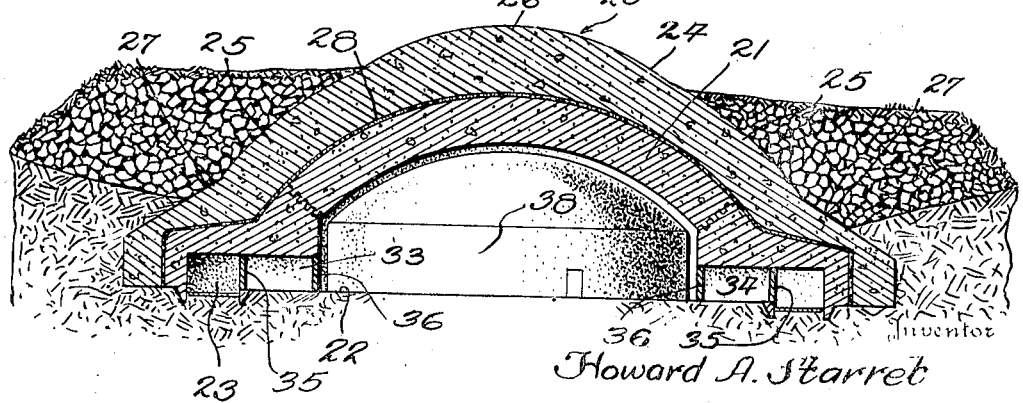

April 11, 1944.　　　H. A. STARRET　　　2,346,196
BOMBPROOF SHELTER
Filed Aug. 2, 1941　　　6 Sheets-Sheet 3

Inventor
Howard A. Starret
By
(signature)
Attorney

April 11, 1944.  H. A. STARRET  2,346,196
BOMBPROOF SHELTER
Filed Aug. 2, 1941   6 Sheets-Sheet 4

Inventor
Howard A. Starret
By Wm F. Doyle
Attorney

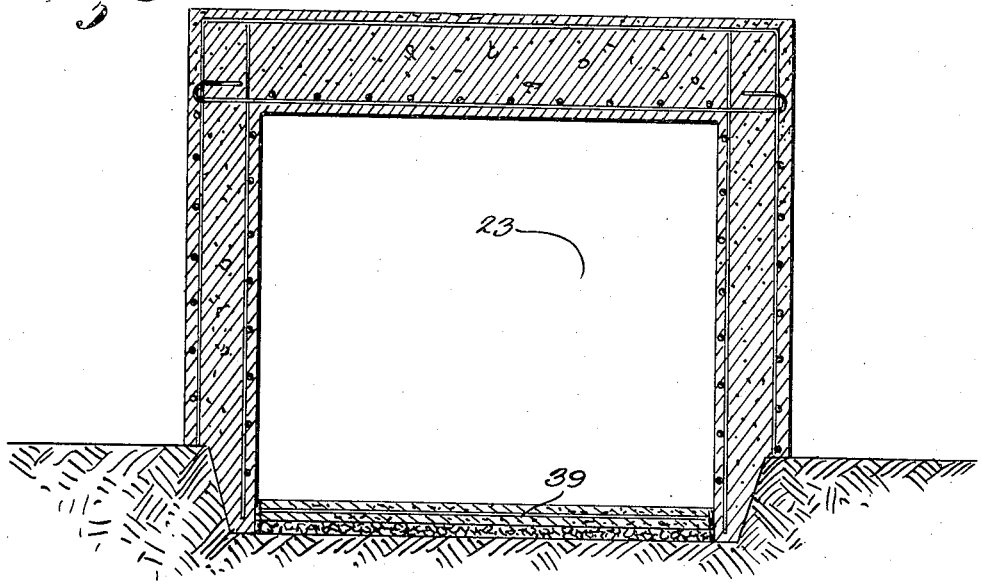
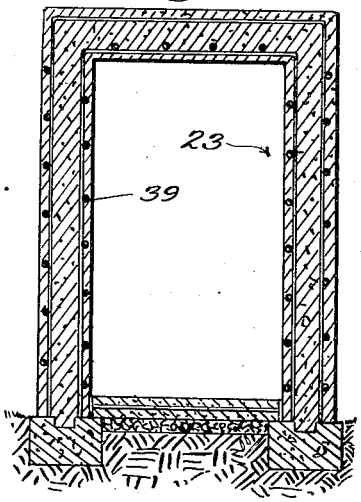
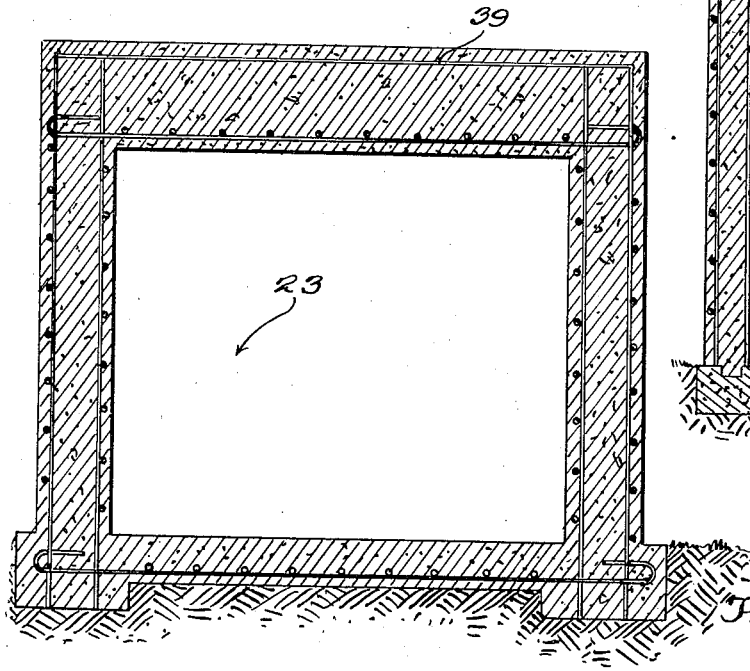

April 11, 1944.   H. A. STARRET   2,346,196
BOMBPROOF SHELTER
Filed Aug. 2, 1941   6 Sheets-Sheet 6
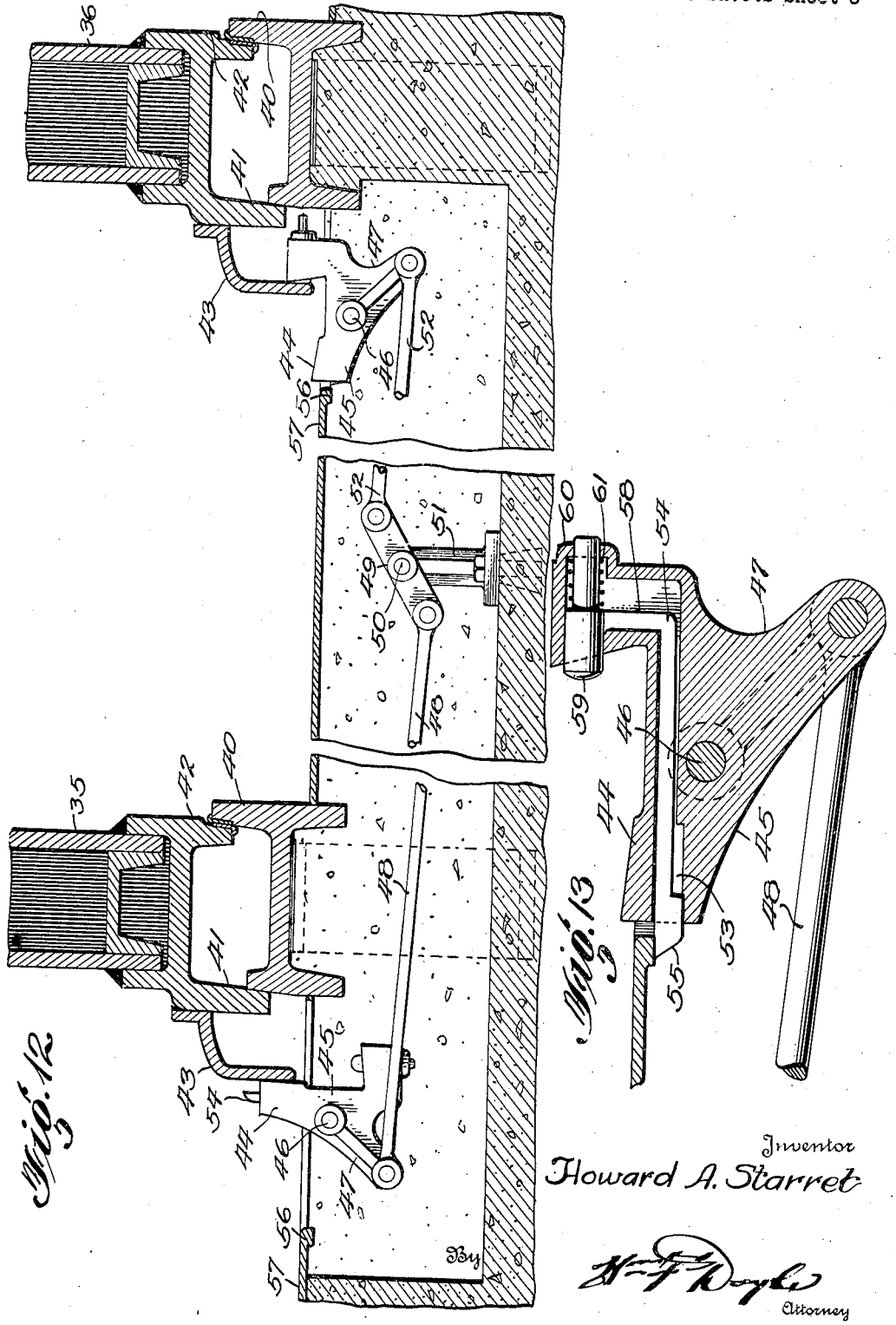
Inventor
Howard A. Starret
By N. F. Doyle
Attorney Patented Apr. 11, 1944

2,346,196

UNITED STATES PATENT OFFICE 2,346,196

BOMBPROOF SHELTER

Howard A. Starret, United States Army

Application August 2, 1941, Serial No. 405,157

11 Claims. (Cl. 109—1)

(Granted under the act of March 3, 1883, as amended April 30, 1928; 370 O. G. 757)

The invention described herein, if patented, may be manufactured and used by or for the Government for governmental purposes without the payment of any royalty thereon.

This invention relates to bombproof shelters, and more particularly to the provision of a novel bombproof shelter especially adapted for the protection of buildings housing personnel and equipment.

The instrumentalities of destruction of modern warfare exert tremendous force due to their weight, their velocities at time of impact, and the large charges of explosives which they carry. Projectiles weighing in the neighborhood of 4000 pounds might possibly be used in air raids, and have a velocity at impact of about 1275 feet per second. Structures heretofore designed to provide protection from heavy high explosive projectiles traveling at great velocities have been objectionable in that they have been of insufficient strength to withstand the enormous force from the projectiles without requiring unusually expensive construction. Also, such structures are not provided with means to compensate for and minimize vibration caused by explosions in the immediate vicinity. Obviously, such structures are impractical for the housing of personnel and equipment such as radio transmitting apparatus, which must be adequately protected from shocks and vibrations as much as practicable.

It is, therefore, an object of this invention to provide a dome-shaped bombproof shelter of novel construction for effectively providing shelter for radio transmitting apparatus and the like, from bombs dropped by aircraft or otherwise, and from vibrations due to shocks and explosions.

A further object is the provision of a bombproof shelter of substantially dome shape, having a circumferential passageway provided with labyrinthically arranged inclined entrances and air chambers connecting the passageway with the interior of the shelter, the air chamber being diametrically arranged and positioned at substantially 90 degrees from the entrances.

A further object is the provision of a bombproof shelter having a shape to provide an outer surface affording a minimum target area and an interior of greater volume and in which buildings of greater floor space than is possible with other structures using the same or a greater amount of material can be erected entirely separate from the dome.

A further object is the provision of a bombproof shelter having entrances affording absolute protection against fragments having an initial velocity of an order of 7000 feet per second from a detonation of a 4000 pound bomb and protection against an air blast from the detonation of such a bomb, which air blast may exceed 75 pounds per square inch at a distance of 50 feet from the point of detonation. Provision is also made to resist vibratory effects.

These and other objects are attained by the novel construction hereinafter described in the following specification and described in the accompanying drawings, forming a part hereof, and in which:

Fig. 3 is a horizontal section through passageway, gas chamber and interior of the shelter, in which separate interior building is built.

Fig. 4 is a vertical section showing passageway, gas chambers and interior of the shelter in which separate interior building is built.

Fig. 9 is a transverse section taken on line 9—9 of Fig. 6.

Fig. 10 is a transverse section taken on line 10—10 of Fig. 6.

Fig. 11 is a transverse section on line 11—11 of Fig. 5.

Fig. 12 is a fragmentary view of the door operating mechanism.

Fig. 13 is a sectional view of the door stop mechanism shown in Fig. 12.

Figure 1:
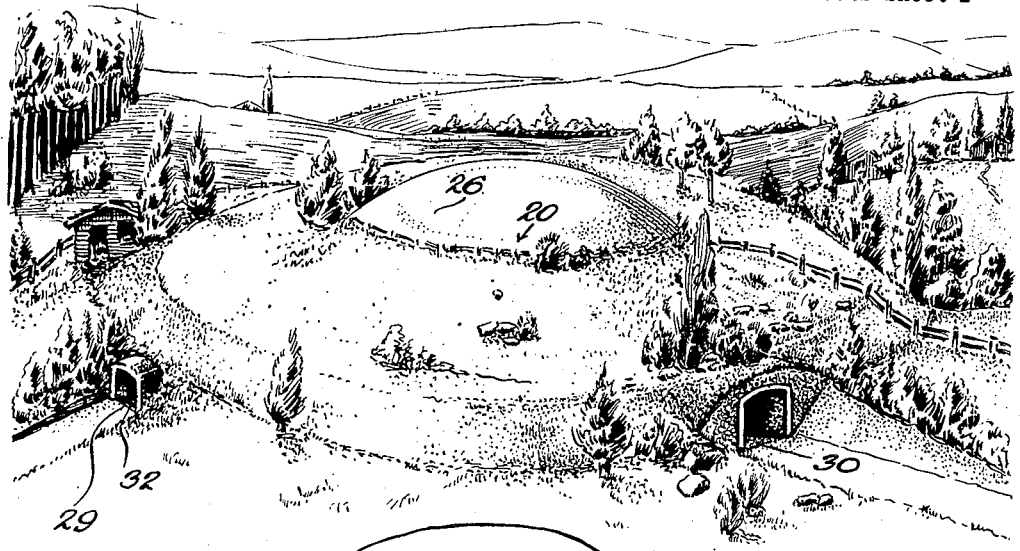
Fig. 1 is a perspective view of a bombproof shelter embodying the invention.
Figure 2:
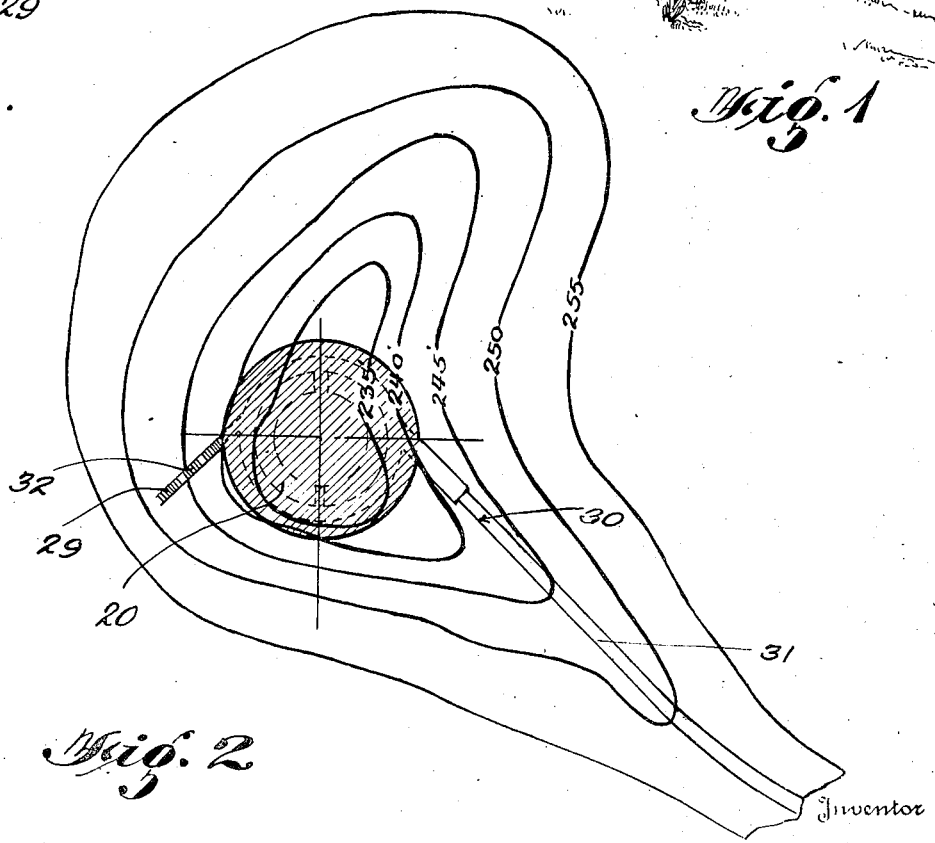
Fig. 2 is a diagram showing location of shelter with regard to the terrain.

Referring to the drawings, the bombproof shelter 20 is shown to comprise a spherical dome formed of a layer 21 having a base 22 in which is formed a circumferential passageway 23 extending completely around the base. The passageway 23 is of sufficient width and height to accommodate small trucks for transporting supplies into the shelter.

The layer 21 of reinforced concrete is covered with a layer 24 of ordinary concrete, which has a section or zone 25 of a predetermined curvature, and a cap or sector 26 of greater curvature than the zone 25. The sector 26 merges into zone 25 and the latter merges into a flat inclined surface 27. (See Fig. 4).

To minimize vibrations of the reinforced concrete layer 21 due to the impact of projectiles and detonations on the outer layer 24, there is interposed between the reinforced concrete layer 21 and the concrete layer 24, a layer 28 of insulating vibration absorbing fibre board or loose fine dry sand. The curvature of the zone and sector are such that a projectile striking the surfaces will ricochet or be deflected in such a manner as to decrease its effectiveness. Regardless of the manner in which a projectile strikes the dome, by reason of the shape of the sector and zone, the arrangement of the layers of reinforced concrete and plain concrete present a definite thickness of material to resist the force of the projectile and the resulting forces are compressive with no tensile stresses. That is, the force of impact of the projectile is distributed so that there is no tension or bending of any section of the shelter.

The shape and construction of the dome also enables natural drainage, simplifies replacement of concrete destroyed by penetration or detonation, and obviates the necessity of replacing steel reinforcement in the concrete where penetration or detonation might occur. The dome blends with the terrain and may be easily camouflaged to afford protection by concealment.

Figure 5:
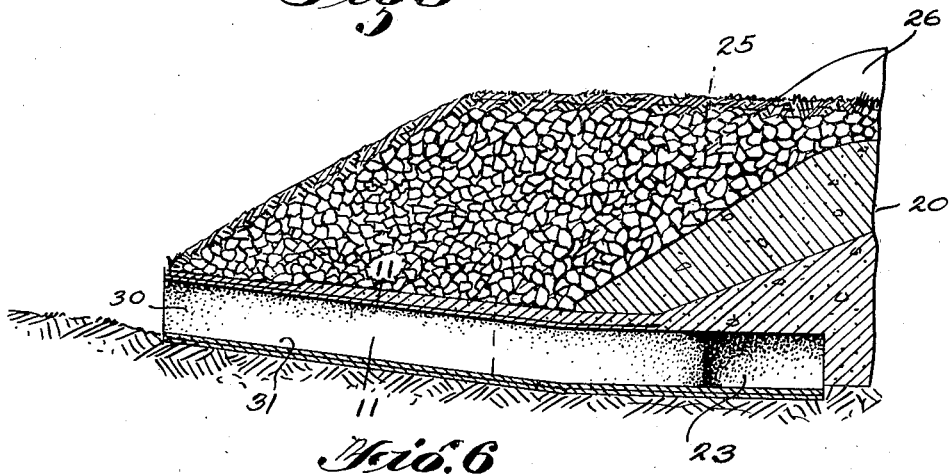
Fig. 5 is a vertical section through the ramp in the shelter.
Figure 6:
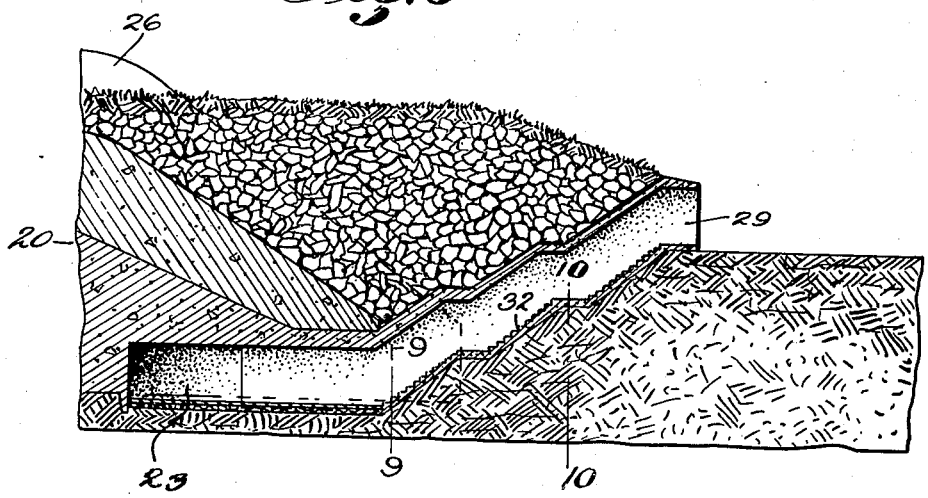
Fig. 6 is a vertical sectional view of a stairway in the shelter.

The passageway 23 is provided with two diametrically arranged entrances 29 and 30, both of which are inclined upwardly from the passageway. The entrances are oblique and nearly tangential to the passageway, entrance 30 leading to a ramp 31, as shown in Fig. 5, and entrance 29 leading to stairs 32 as shown in Fig. 6. The ramp 31 is of sufficient width to accommodate trucks and the like, and leads to a roadway.

Access to the interior of the dome from the passageway is enabled by diametrically arranged air chambers 33 and 34. Each chamber has a door 35 opening into the passageway and another door 36 opening into the interior 37 of the dome. The doors of each chamber are so connected that only one door can be open at any time, which arrangement provides an effective air-lock minimizing the passage of obnoxious gases to the interior 37.

Within the interior 37 there is constructed a building 38 which may have a plurality of floors. The building 38 is spaced from and has no contact whatever with the dome-shaped shelter above described, and vibrations of the dome shelter will not affect the building 38 and the radio transmitting equipment or other equipment therein.

The arrangement of the entrances affords protection from fragments having an initial velocity of 7000 feet per second from the detonation of a 4000 pound bomb, and also protects against air blasts from such bombs which exceed 75 pounds per square inch at a distance of 50 feet.

It will be noted that from either entrance 29 or 30 to the inner structure 38, which is entirely separated from the dome shelter, the passageway is substantially in the form of a labyrinth pesenting a tortuous path and provides complete protection to the inner structure 38 and personnel from falling fragments, air blasts and the like. The force of an air blast having a pressure of 75 pounds per square inch at an entrance will be diminished to about three pounds per square inch when it reaches either of the passageway doors 35 to the air chambers 33 or 34.

The geometrical shape of the dome enables the use of a minimum amount of concrete and steel reinforcement to withstand the tremendous impact of a 4000 pound projectile and fragments having an initial velocity of the order of 7000 feet per second. The dome-like shelter offers a minimum target area; the maintenance cost is low, and the structure may be adequately inspected at any time. It also provides adequate protection without secondary protection walls or concrete foundation mat, and without developing earth pressure on secondary protection walls.

The cap or sector 26 and the zone 25 in the arrangement shown, present at all angles of impact substantially the same thickness of plain concrete and reinforced concrete. A thickness of about 23 feet with the structure shown will provide complete protection against the penetration and detonation of a 4000 pound medium case bomb with an initial pressure of 710 tons per square inch at time of detonation and against the load impact of such a bomb with an impinging velocity of 1275 feet per second. The impact load on the bombproof shelter structure produces compression only, with no tension or bending tendency.

Figure 7:
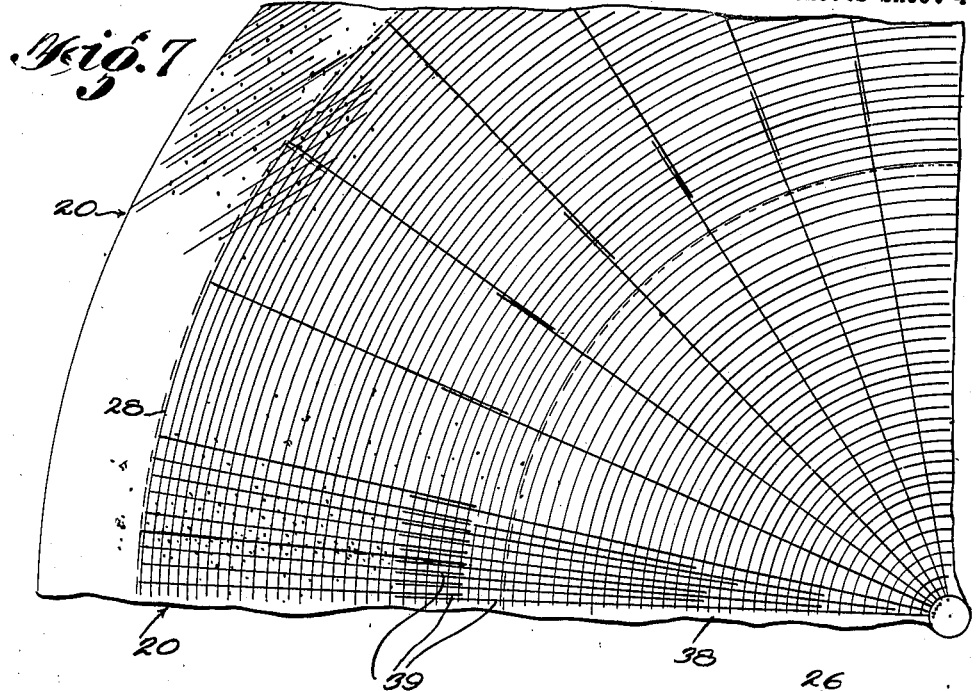
Fig. 7 is a diagrammatic plan showing arrangement of the steel reinforcements.
Figure 8:
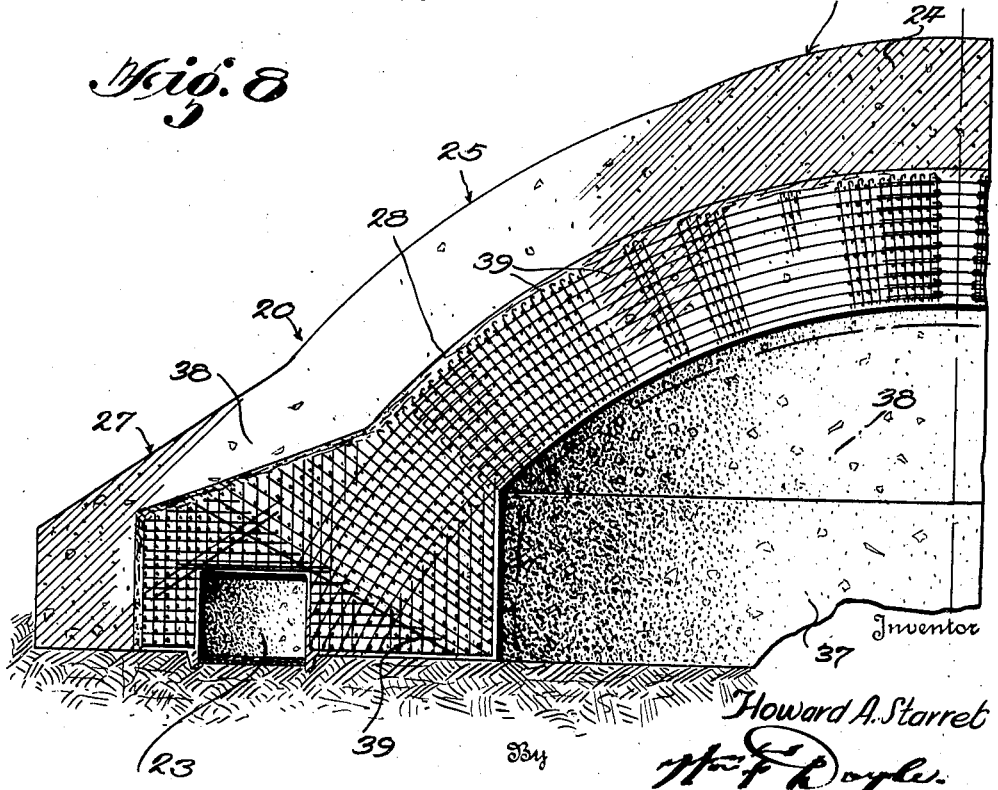
Fig. 8 is a fragmentary longitudinal section of the same.

In Figs. 7 and 8 there is shown the arrangement of reinforcing members 39 within the layer 21. These members are spotwelded at all contact points and are grounded to prevent interference with the radio transmitting apparatus which is housed within the building 38 in the interior 37 of the shelter 20.

Figs. 9, 10 and 11 show the arrangement of the reinforcing members 39 in the passageway 23 leading to the ramp 31 and stairs 32. The rod member shown in Fig. 9 is one of the reinforcing members 39 and as shown forms in the floor of the passageway a like arrangement as is called for in the dome in the shelter.

In Fig. 12 there is shown a device for interlocking the doors 35 and 36 to prevent both doors from being open at the same time. As will be seen, the bottom edge of the doors are spaced about four inches above the floor level and to provide air-tight joints when the doors are closed upstanding sills 40 are arranged to engage downwardly projecting flanges 41 and 42 on the doors 35 and 36 respectively.

Each door has attached thereto a downwardly extending lug 43 which engages an upstanding arm 44 of a bell crank lever 45 pivoted at 46. The bell crank lever has an arm 47 pivotally connected to a link 48 which is pivotally connected to one end of a lever 49 pivoted at 50 to a supporting bracket 51, the other end of the lever 48 being pivotally connected to a link 52 which is connected to a bell crank lever 45 associated with other structure similar to that above described.

The arm 44 of the bell crank lever is provided with a longitudinal slot 53 in which is slidably positioned a latch 54, having a beveled end 55 adapted to pass over the edge 56 of a floor plot 57 which closes the trough in which the mechanism is mounted. The latch 54 has a right angularly directed portion 58 which carries a plunger 59 normally forced outwardly through an aperture in the casing 60 by a compression spring 61.

In operation, when the door 36 is closed, the lug 43 forces the plunger 59 into the casing 60 against the action of spring 61 and moves the latch 54 from engagement with the edge 56. The bell crank lever can now be rotated about this pivot 46. When the opposite door 35 is opened the associated bell crank lever will be rotated and through the various links and levers above described the bell crank lever associated with door 36 will be rotated to move arm 44 to a vertical position. At the same time the bell crank lever associated with door 35 will be latched and movement of the bell crank levers will be prevented until door 35 is again closed. While door 35 is open, door 36 will be prevented from opening by the arm 44 and vice versa, when door 36 is open door 35 is prevented from opening by a similar arm 44.

From the above description it will be seen that there has been provided a simple and effective structure for protecting buildings housing personnel and/or equipment.

The foregoing description is to be regarded as descriptive only and not limitative of the invention, of which obviously embodiments may be constructed without departing from the spirit and scope of the appended claims.

Having thus described the invention, what is claimed as new and desired to secure by Letters Patent is:

1. A bombproof shelter, comprising a hollow dome-like structure having a centrally positioned cap merging into a zone having less curvature than the cap, and a flat downwardly inclined surface merging into the zone, said structure having an outer layer of plain concrete and an inner layer of reinforced concrete, said layer of reinforced concrete having adjacent the base of the structure a circumferential passage-way provided with diametrically arranged inclined entrances from the outside of the structure and air chambers connecting the interior of the structure with the passage-way.

2. A bombproof shelter, comprising a circular hollow dome-like structure having an outer layer of plain concrete and an inner layer of reinforced concrete, said layer of reinforced concrete having adjacent the base of the structure a circumferential passageway provided with diametrically arranged inclined entrances from the outside of the structure and air chambers connecting the interior of the structure with the passageway.

3. In a bombproof shelter having a bomb-resisting wall, a circumferential passageway in said wall, diametrically arranged inclined entrances in communication with the said passageway from the outside of the shelter, and air chambers connecting the passageway and the interior of the shelter, the said inclined entrances and the said air chambers being angularly spaced 90° apart whereby the said interior of the shelter is blocked against direct communication with the outside of the shelter.

4. In a hollow dome-shaped bombproof shelter, a wall of reinforced concrete having a circular passageway formed in the base thereof, said passageway having diametrically arranged entrances thereto, and air chambers connecting the passageway and the interior of the shelter, each air chamber having a door opening to the passageway and a door opening to the interior of the shelter, said doors being interlocked so that when one door is open the other door is closed.

5. In a bombproof shelter, a bomb resisting wall having a circumferential passageway therein, diametrically arranged inclined entrances in communication with the said passageway from the outside of the shelter, and air chambers connecting the passageway and the interior of the shelter, said entrances being oblique to the passageway.

6. A bombproof shelter, comprising a hollow dome-like structure having a centrally positioned cap merging into a zone having less curvature than the cap, a flat downwardly inclined surface merging into the zone, said structure having an outer layer of plain concrete and an inner layer of reinforced concrete, the base of the layer of reinforced concrete having a circumferential passageway therein, diametrically arranged inclined entrances to the passageway from the outside of the shelter, air chambers connecting the passageway to the interior of the structure, and a building in the interior of the structure, said building being entirely spaced from the interior of said dome structure.

7. A bombproof structure, comprising a hollow dome-like structure having a centrally positioned cap merging into a zone having less curvature than the cap, a flat downwardly inclined surface merging into the zone, and a building in the interior of said structure, said building being completely spaced from the interior of the dome structure and entirely independent thereof.

8. A bombproof shelter, comprising a hollow dome-like structure having a bomb resisting wall, a circumferential passageway therein, diametrically arranged inclined entrances in communication with the said passageway from the outside of the shelter, said entrances being disposed obliquely to the said passagway, air chambers connecting the said passageway with the interior of the shelter, the said inclined entrances and the said air chambers being angularly spaced 90° apart whereby the said interior of the shelter is blocked against direct communication with the outside of the shelter, and a building in the interior of said dome structure, said building being completely spaced from the interior of the structure.

9. In a bombproof shelter, bomb resisting walls having an inner and outer layer of concrete, said inner layer having a circumferential passageway therein provided with a plurality of labyrinthically arranged entrances, said entrances being diametrically arranged and inclined with respect to the exterior of said walls and air chambers connecting the interior of the shelter with said passage-way.

10. In a bombproof shelter, a hollow dome-like structure having an outer layer of plain concrete and an inner layer of reinforced concrete the base of the said inner layer of reinforced concrete having a circumferential passageway therein, diametrically arranged inclined entrances in communication with the said passageway from the outside of the shelter, air chambers connecting the said passageway to the interior of the shelter, the said inclined entrances and the said air chambers being angularly spaced 90° apart whereby the said interior of the shelter is blocked against direct communication with the outside of the shelter, fine dry sand interposed between said layers the said sand minimizing vibration of the said reinforced concrete layer due to impact of projectiles and detonations on the outer concrete layer, and a building in the interior of the shelter, the said building being entirely spaced from the interior of the said inner reinforced concrete layer of the said dome-like structure.

11. In a bombproof shelter, a hollow dome-like structure having an outer layer of plain concrete and an inner layer of reinforced concrete the base of the said inner layer of reinforced concrete having a circumferential passageway therein, diametrically arranged inclined entrances in communication with the said passageway from the outside of the shelter, air chambers connecting the said passageway to the interior of the shelter, the said inclined entrances and the said air chambers being angularly spaced 90° apart whereby the said interior of the shelter is blocked against direct communication with the outside of the shelter, a layer of insulating vibration absorbing fiber board interposed between said layers of concrete the said layer of insulating fiber board minimizing vibration of the said reinforced concrete layer due to impact of projectiles and detonations on the outer concrete layer, and a building in the interior of the shelter, the said building being entirely spaced from the interior of the said inner reinforced concrete layer of the said dome-like structure.

HOWARD A. STARRET.